(12) United States Patent
Zhan

(10) Patent No.: US 10,002,279 B2
(45) Date of Patent: Jun. 19, 2018

(54) DETECTION METHOD AND DEVICE FOR DETECTING FINGERPRINT

(71) Applicant: SHENZHEN HUIDING TECHNOLOGY CO., LTD., Shenzhen, Guangdong (CN)

(72) Inventor: Chang Zhan, Guangdong (CN)

(73) Assignee: SHENZHEN GOODIX TECHNOLOGY CO., LTD., Shenzhen, Guangdong (CN)

( * ) Notice: Subject to any disclaimer, the term of this patent is extended or adjusted under 35 U.S.C. 154(b) by 0 days. days.

(21) Appl. No.: 15/247,061

(22) Filed: Aug. 25, 2016

(65) Prior Publication Data

US 2016/0364596 A1 Dec. 15, 2016

Related U.S. Application Data

(63) Continuation of application No. PCT/CN2015/077446, filed on Apr. 24, 2015.

(30) Foreign Application Priority Data

Nov. 14, 2014 (CN) .......................... 2014 1 0647195

(51) Int. Cl.
G06K 9/00 (2006.01)
G06F 3/044 (2006.01)

(52) U.S. Cl.
CPC ............ G06K 9/0002 (2013.01); G06F 3/044 (2013.01); G06K 9/00006 (2013.01)

(58) Field of Classification Search
CPC .. G06F 3/044; G01R 27/2605; G06K 9/0002; G06K 9/00006
See application file for complete search history.

(56) References Cited

U.S. PATENT DOCUMENTS

| 8,031,046 B2 | 10/2011 | Franza et al. |
| 2003/0091724 A1* | 5/2003 | Mizoguchi ......... G06K 9/00087 427/1 |

(Continued)

FOREIGN PATENT DOCUMENTS

| CN | 101777115 A | 7/2010 |
| CN | 102004903 A | 10/2011 |

(Continued)

OTHER PUBLICATIONS

State Intellectual Property Office of the P.R. China (ISR/CN), "International Search Report for PCT/CN2015/077446", China, Aug. 17, 2015.

(Continued)

*Primary Examiner* — Kenny Cese
(74) *Attorney, Agent, or Firm* — Tim Tingkang Xia, Esq.; Locke Lord LLP

(57) ABSTRACT

The present disclosure provides a detection method and apparatus for fingerprint detection. The method comprises: S1. detecting a capacitance on a detection electrode which a fingerprint detection apparatus comprises; S2: when the capacitance exceeds a predetermined capacitance threshold, enabling a part of detection units of a fingerprint detection array to perform fingerprint pre-detection, and acquiring data information of the fingerprint pre-detection; and S3: when the data information exceeds a first predetermined threshold, enabling all the detection units of the fingerprint detection array to perform fingerprint scanning. With the method for fingerprint detection to according to the embodiments of the present disclosure, the fingerprint detection array is initiated for full-array scanning upon reliable and effective identification that a finger touches a fingerprint detection apparatus, which greatly reduces the power consumption of the fingerprint detection.

19 Claims, 2 Drawing Sheets

(56) References Cited

U.S. PATENT DOCUMENTS

| | | | |
|---|---|---|---|
| 2010/0098303 A1* | 4/2010 | Chen | G06K 9/0002 |
| | | | 382/124 |
| 2012/0182253 A1 | 7/2012 | Brosnan | |
| 2013/0271422 A1 | 10/2013 | Hotelling et al. | |
| 2014/0077827 A1 | 3/2014 | Seguine | |
| 2014/0292396 A1* | 10/2014 | Bruwer | H03K 17/955 |
| | | | 327/517 |
| 2015/0070137 A1† | 3/2015 | Minteer | |
| 2015/0070311 A1* | 3/2015 | Caldwell | G06F 3/0416 |
| | | | 345/174 |
| 2016/0307020 A1† | 10/2016 | Zhang | |

FOREIGN PATENT DOCUMENTS

| | | |
|---|---|---|
| CN | 102750520 A | 10/2012 |
| CN | 103778420 A | 5/2014 |
| CN | 203746088 U | 7/2014 |
| CN | 104318222 A | 1/2015 |
| JP | 2003132341 A | 5/2003 |

OTHER PUBLICATIONS

State Intellectual Property Office of the P. R. C., "First Chinese Office Action for Application No. 201410647195.9", China, Sep. 26, 2016.
State Intellectual Property Office of the P. R. C., "Second Chinese Office Action for Application No. 201410647195.9", China, Feb. 20, 2017.
Korean Intellectual Property Office, "First Korean Office Action for Application No. 10-2016-7021726", Korea, May 8, 2017.

\* cited by examiner
† cited by third party

DETECTION METHOD AND DEVICE FOR DETECTING FINGERPRINT

CROSS-REFERENCE TO RELATED APPLICATIONS

This application is a continuation of International Patent Application No. PCT/CN2015/077446, with an international filing date of Apr. 24, 2015, designating the United States, now pending, which is based on Chinese Patent Application No. 201410647195.9, filed Nov. 14, 2014. The contents of these specifications are incorporated herein by reference.

BACKGROUND OF THE INVENTION

Field of the Invention

The present disclosure relates to the technical field of fingerprint detection, and in particular, to a detection method and apparatus for fingerprint detection.

Description of the Related Art

At present, a capacitive inductive fingerprint detection apparatus has been used in a new generation of electronic devices. The fingerprint detection apparatus includes a fingerprint detection array. The fingerprint detection array performs full-array scanning according to a predetermined frequency to acquire fingerprint data, and accordingly determines whether a finger touches the fingerprint detection apparatus. When it is determined that a finger touches the fingerprint detection apparatus, a fingerprint image is formed. This manner requires that the fingerprint detection array constantly stays in an operating state of full-array scanning. As a result, the power consumption of the entire fingerprint detection apparatus is high.

SUMMARY OF THE INVENTION

The present disclosure may solve at least one of the above technical problems.

To this end, a first objective of the present disclosure is to provide a detection method for fingerprint detection. With the method, a fingerprint detection array is initiated for full-array scanning upon reliable and effective identification that a finger touches a fingerprint detection apparatus, which greatly reduces the power consumption of the fingerprint detection.

To achieve the above objective, a first aspect of embodiments of the present disclosure provides a detection method for fingerprint detection, including the following steps: S1. detecting a capacitance on a detection electrode included in a fingerprint detection apparatus; S2: when the capacitance exceeds a predetermined capacitance threshold, initiating a part of detection units of a fingerprint detection array to perform fingerprint pre-detection, and acquiring data information of the fingerprint pre-detection; and S3: when the data information exceeds a first predetermined threshold, initiating all the detection units of the fingerprint detection array to perform fingerprint scanning.

A second objective of the present disclosure is to provide a detection apparatus for fingerprint detection.

To achieve the above objective, a second aspect of embodiments of the present disclosure provides a detection apparatus for fingerprint detection, including: a capacitance detection module, a detection electrode, a controller and a fingerprint detection array; wherein the capacitance detection module is configured to detect a capacitance on the detection electrode, and send a detection result to the controller; the controller is configured to control the fingerprint detection array to perform fingerprint pre-detection when the capacitance exceeds a predetermined capacitance threshold; the fingerprint detection array is configured to, upon receiving a fingerprint pre-detection command from the controller, initiate a part of detection units to perform the fingerprint pre-detection, and send acquired data information to the controller; the controller is further configured to control the fingerprint detection array to perform fingerprint scanning when the data information exceeds a first predetermined threshold; and the fingerprint detection array is further configured to initiate all the detection units to perform the fingerprint scanning upon receiving a fingerprint scanning command from the controller.

The additional aspects and advantages of the present disclosure are partially provided in the following description, and the other portions would become more obvious from the following description or would be known from the practice of the present disclosure.

BRIEF DESCRIPTION OF THE DRAWINGS

The above described and/or additional aspects and advantages of the present disclosure would be obvious and simple to understand with reference to the description of the embodiments in combination with the accompanying drawings.

DETAILED DESCRIPTION OF THE EMBODIMENTS

Figure 1:
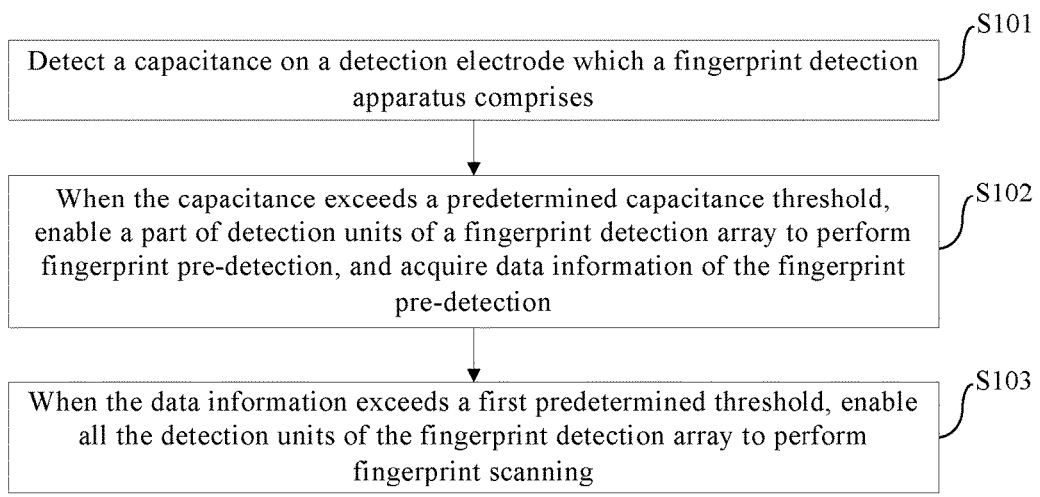
FIG. 1 is a flowchart of a detection method for fingerprint detection according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure. On the contrary, the embodiments of the present disclosure cover all the variations, modifications and equivalents made within the spirit and scope as defined by the appended claims of the present disclosure.

It should be noted that terms such as "first", "second" and the like are merely used for illustration purpose during the description of the present disclosure, and shall not be understood as indicating or implying relative importance. In the description of the present disclosure, it should be noted that unless otherwise specified and defined, the terms "coupled" and "connected" and derivative forms of these words shall be understood in a broad sense, which, for example, may be understood as fixed connection, detachable connection or integral connection; may be mechanically connected or electrically connected; or may be directly connected, indirectly connected via an intermediate medium. Persons of ordinary skill in the art may understand the specific meanings of the above terms in the present disclosure according to the actual circumstances and contexts. In addition, during the description of the present disclosure, the term "multiple", "more" or "a plurality of" refers to at least two unless otherwise specified.

Any process or method description illustrated in the flowcharts or described herein in any manner may be understood as including one or a plurality of modules, segments or portions of codes of executable instructions for implementing specific logic functions or steps in the processes. In addition, the scope of the preferred embodiments of the present disclosure covers other implementations. The implementation of the functions or steps may not be subjected to the illustrated or discussed sequence; however, the functions may be implemented in a substantially simultaneous manner or in a contrary sequence according to the involved functions, which shall be understood by a person skilled in the art according to the embodiments of the present disclosure.

A detection method and apparatus for fingerprint detection according to embodiments of the present disclosure are described herein with reference to the attached drawings.

Figure 2:
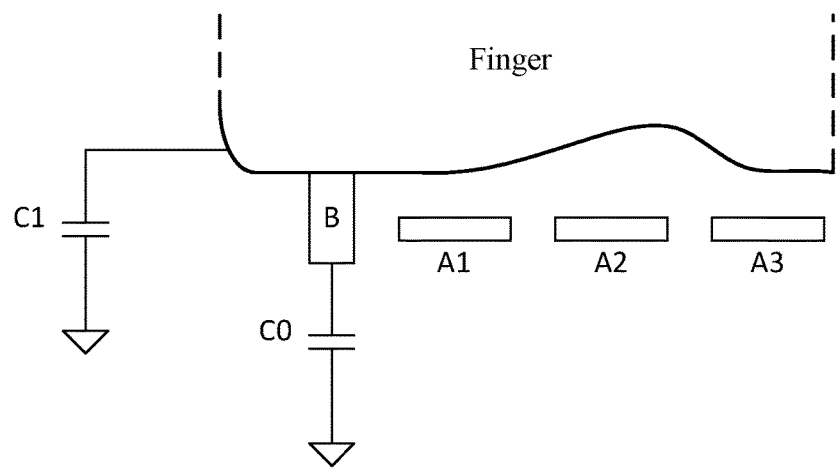
FIG. 2 is a schematic diagram of a capacitance change on a detection electrode when a finger touches the detection electrode according to an embodiment of the present disclosure.

FIG. 1 is a flowchart of a detection method for fingerprint detection according to an embodiment of the present disclosure, and FIG. 2 is a schematic diagram of a capacitance change on a detection electrode when a finger touches the detection electrode according to an embodiment of the present disclosure. As illustrated in FIG. 1, the detection method for fingerprint detection includes:

S101: A capacitance on a detection electrode is detected, and the detection electrode is included in a fingerprint detection apparatus.

In the embodiments of the present disclosure, the fingerprint detection apparatus may operate in three operating modes: a capacitance detection mode, a fingerprint pre-detection mode and a fingerprint scanning mode. In a first operating mode, that is, in the capacitance detection mode, changes of an external capacitance of the fingerprint detection apparatus are detected. To be specific, as illustrated in FIG. 2, the fingerprint detection apparatus includes a fingerprint detection array, A1 to A3 represent detection units of the fingerprint detection array, and B is a detection electrode which may be touched by a finger. A parasitic capacitance between the detection electrode B and a system ground is $C_0$. When a finger of a user touches the detection electrode B, a capacitance between the finger and the system ground is $C_1$, that is, in this case the capacitance $C_1$ between the finger and the system ground may be connected in parallel to the parasitic capacitance $C_0$. To be specific, when the finger touches the detection electrode B, the capacitance on the detection electrode should be $C_0+C_1$.

S102: When the capacitance on the detection electrode exceeds a predetermined capacitance threshold, a part of detection units of a fingerprint detection array are initiated to perform fingerprint pre-detection, and data information of the fingerprint pre-detection is acquired.

To be specific, a predetermined capacitance threshold $C_{TH}$ may be predefined in the fingerprint detection apparatus. If it is determined that the capacitance $C_0+C_1$ on the detection electrode is greater than the predetermined capacitance threshold $C_{TH}$, that is, a finger touches the detection electrode, the fingerprint detection apparatus enters a second operating mode, that is, the fingerprint pre-detection mode.

However, the parasitic capacitances $C_0$ between the detection electrode B and the system ground varies in different fingerprint detection apparatuses, and the capacitance $C_1$ between the finger and the system ground may be subjected to a great change due to different touch manners of the finger. Therefore, in different application environments, an error may occur when whether the finger touches the detection electrode is determined only by using the predetermined capacitance threshold $C_{TH}$. In this case, the fingerprint detection apparatus enters the fingerprint pre-detection mode for a further determination. As such, both reliability and accuracy of finger touch detection may be improved.

In another embodiment of the present disclosure, if it is determined that the capacitance $C_0+C_1$ on the detection electrode does not exceed the predetermined capacitance threshold $C_{TH}$, the fingerprint detection apparatus keep staying in the capacitance detection mode. That is, the fingerprint detection apparatus repeatedly detects the capacitance $C_0+C_1$ on the detection electrode, and determines whether the capacitance $C_0+C_1$ on the detection electrode exceeds the predetermined capacitance threshold $C_{TH}$.

After the fingerprint detection apparatus enters the fingerprint pre-detection mode, a part of detection units of the fingerprint detection array are initiated to perform fingerprint pre-detection. The part of detection units may be one detection unit or several detection units of the fingerprint detection array. In the embodiments of the present disclosure, only a part of detection units of the fingerprint detection array are used for fingerprint pre-detection, instead of all the detection units of the fingerprint detection array are used for performing the fingerprint pre-detection, which greatly reduces the power consumption of the fingerprint detection apparatus. Upon the fingerprint pre-detection, the fingerprint detection apparatus acquires the data information $Data_1$ of the fingerprint pre-detection.

S103: When the data information exceeds a first predetermined threshold, all to the detection units of the fingerprint detection array are initiated to perform fingerprint scanning.

To be specific, if it is determined that the data information $Data_1$ of the fingerprint pre-detection is greater than a first predetermined threshold $Data_{TH}$, the fingerprint detection apparatus enters a third operating mode, that is, the fingerprint scanning mode. In this case, all the detection units of the fingerprint detection array are initiated to perform fingerprint scanning. The first predetermined threshold $Data_{TH}$ may be predefined in the fingerprint detection apparatus.

When the detection electrode is not touched by a finger, the data information of the fingerprint pre-detection acquired by the fingerprint detection apparatus is $Data_0$; when the detection electrode is touched by a finger, the data information of the fingerprint pre-detection acquired by the fingerprint detection apparatus is $Data_1$. Since if the detection electrode is not touched by a finger, the data information $Data_0$ is almost 0, as long as the data information $Data_1$ is great enough when a finger touches the detection electrode, a sufficiently wide range is available for defining the first predetermined threshold $Data_{TH}$, such that whether a finger touches the detection electrode may be further determined.

Upon double confirmation of the capacitance detection mode and the fingerprint pre-detection mode, the fingerprint detection apparatus enters the fingerprint scanning mode to initiate all the detection units of the array to perform fingerprint scanning. As such, both reliability and accuracy of the finger touch detection are improved.

After the fingerprint detection apparatus enters the fingerprint scanning mode, all the detection units of the fingerprint detection array are initiated to perform the fingerprint scanning. It should be understood that initiating all the detection units is not limited to the case where all the detection units are initiated to simultaneously perform fingerprint scanning, which may be a case where all the detection units stay in an operating state of the fingerprint scanning. An internal drive circuit of the fingerprint detection apparatus performs time-sharing driving for the fingerprint detection array based on row/column of the detection units, and the detection units perform fingerprint scanning in sequence to acquire fingerprint data of the entire array, that is, one frame of the fingerprint data. The fingerprint scanning may be implemented by the fingerprint detection apparatus in a conventional manner, which is not described herein any further.

In another embodiment of the present disclosure, if it is determined that the data information Data1 does not exceed the first predetermined threshold DataTH, the fingerprint detection apparatus returns to the capacitance detection mode. That is, the fingerprint detection apparatus redetects the capacitance C0+C1 on the detection electrode, and determines whether the capacitance C0+C1 exceeds the predetermined capacitance threshold CTH.

In still another embodiment of the present disclosure, the fingerprint detection apparatus further determines whether the number of frames acquired in the fingerprint scanning mode reaches a second predetermined threshold, and if the number of frames in the fingerprint scanning reaches the second predetermined threshold, the fingerprint detection apparatus returns to the capacitance detection mode. In other words, upon completion of acquiring a predetermined number of frames in the fingerprint scanning, the fingerprint detection apparatus returns to the capacitance detection mode. If the number of frames in the fingerprint scanning does not reach the second predetermined threshold, the fingerprint detection apparatus continuously performs fingerprint scanning.

Figure 3:
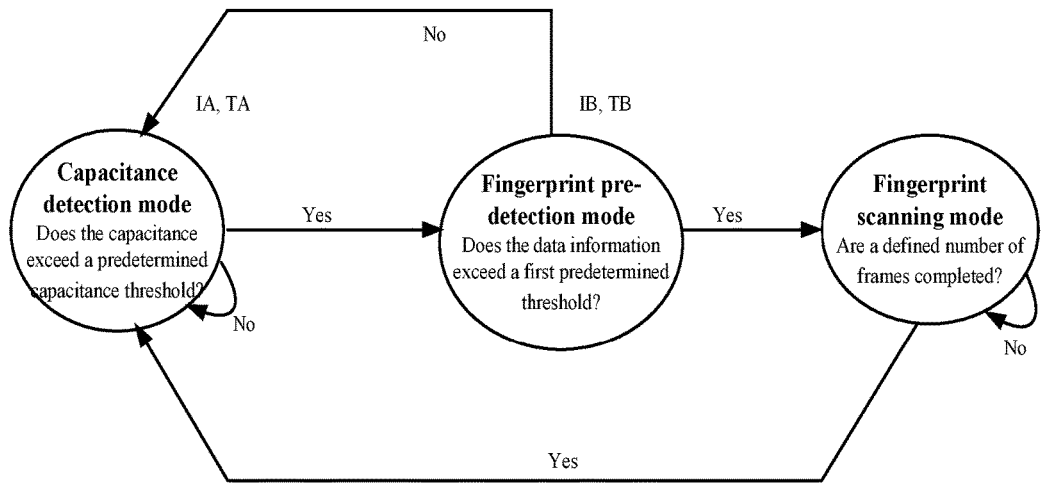
FIG. 3 is a schematic diagram of an operating mode transition diagram of a fingerprint identification apparatus according to an embodiment of the present disclosure.

An operating mode transition diagram of the above fingerprint identification apparatus is as illustrated in FIG. 3.

The advantages of the detection method for fingerprint detection according to the embodiments of the present disclosure are described hereinafter by using a specific example.

As illustrated in FIG. 3, an operating current $I_A$ of a capacitance detection apparatus in a capacitance detection mode is 100 uA, an operating current $I_B$ of the capacitance detection apparatus in a fingerprint pre-detection mode is 1 mA, and an operating current $I_C$ of the capacitance detection apparatus in a fingerprint scanning mode is 10 mA. In the meantime, assume that, during operation, the capacitance detection is effectively triggered at an interval of $T_A$ 100 ms, and an operating period of the fingerprint detection $T_B$ is 1 ms. As such, an average power consumption during a detection period in which the fingerprint detection apparatus detects that a finger touches the fingerprint detection apparatus is: $(I_A*T_A+I_B*T_B)/(T_A+T_B)=108.9$ uA. Therefore, it can be seen that the average power consumption is far less than the operating current 10 mA during the fingerprint scanning.

With the detection method for fingerprint detection in the embodiments of the present disclosure, firstly determine whether a capacitance on a detection electrode exceeds a predetermined capacitance threshold, and when the capacitance exceeds the predetermined capacitance threshold, a part of detection units of a fingerprint detection array are initiated to perform fingerprint pre-detection and acquire data information; and secondly determine whether the data information exceeds a first predetermined threshold, and when the data information exceeds a first predetermined threshold, all the detection units of the fingerprint detection array are initiated to perform fingerprint scanning. In this way, the fingerprint detection array is initiated for full-array scanning upon reliable and effective identification that a finger touches a fingerprint detection apparatus, which greatly reduces the power consumption of the fingerprint detection.

Figure 4:
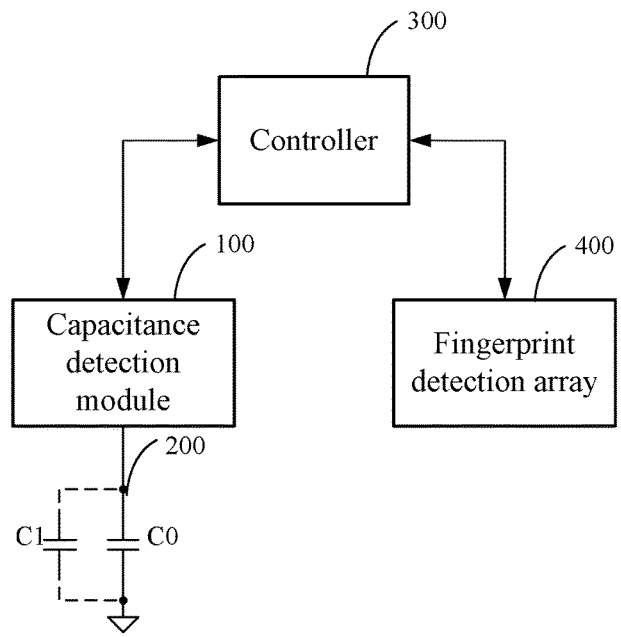
FIG. 4 is a structural schematic diagram of a detection apparatus for fingerprint detection according to an embodiment of the present disclosure.

FIG. 4 is a structural schematic diagram of a detection apparatus for finger detection according to an embodiment of the present disclosure. The detection apparatus includes: a capacitance detection module 100, a detection electrode 200, a controller 300 and a fingerprint detection array 400.

The capacitance detection module 100 detects a capacitance on the detection electrode 200, and sends a detection result to the controller 300. To be specific, when the fingerprint identification apparatus is in a first operating mode, that is, in a capacitance detection mode, the capacitance detection module 100 detects changes of the external capacitance of the fingerprint detection apparatus. A parasitic capacitance between the detection electrode 200 and a system ground is $C_0$. When a finger of a user touches the detection electrode 200, a capacitance between the finger and the system ground is $C_1$, that is, the capacitance $C_1$ between the finger and the system ground may be connected in parallel to the parasitic capacitance $C_0$. To be specific, when a finger touches the detection electrode 200, the capacitance on the detection electrode 200 should be $C_0+C_1$.

When the capacitance on the detection electrode 200 exceeds a predetermined capacitance threshold, the controller 300 controls the fingerprint detection array 400 to perform fingerprint pre-detection.

Upon receiving a fingerprint pre-detection command from the controller 300, the fingerprint detection array 400 initiates a part of detection units to perform the fingerprint pre-detection, and acquires first data information. To be specific, a predetermined capacitance threshold $C_{TH}$ may be predefined in the fingerprint detection apparatus. The capacitance detection module 100 feeds back the detected capacitance $C_0+C_1$ to the controller 300, and the controller 300 performs a next determination. If it is determined that the capacitance is greater than the predetermined capacitance threshold $C_{TH}$, the controller 300 controls the fingerprint detection array 400 to enter a second operating mode, that is a fingerprint pre-detection mode.

Furthermore, a parasitic capacitance $C_0$ between the detection electrode 200 and a system ground varies in different fingerprint detection apparatuses, and the capacitance $C_1$ between the finger and the system ground may be subjected to a great change due to different touch manners of the finger. Therefore, in different application environments, an error may occur when whether the finger touches the detection electrode 200 is determined by the controller 300 only by using the predetermined capacitance threshold $C_{TH}$. In this case, the fingerprint detection apparatus enters the fingerprint pre-detection mode for a further determination according to the present disclosure. As such, both reliability and accuracy of finger touch detection are improved.

In another embodiment of the present disclosure, if the capacitance detected by the capacitance detection module 100 does not exceed the predetermined capacitance threshold, the capacitance detection module 100 continues detecting the capacitance on the detection electrode 200. To be specific, if the controller 300 determines that the capacitance $C_0+C_1$ on the detection electrode 200 does not exceed the predetermined capacitance threshold $C_{TH}$, the controller 300 controls the capacitance detection module 100 to keep staying in the capacitance detection mode. That is, the capacitance detection module 100 repeatedly detects the capacitance $C_0+C_1$ on the detection electrode 200.

After the fingerprint detection array 400 enters the fingerprint pre-detection mode, a part of detection units of the fingerprint detection array 400 are initiated to perform fingerprint pre-detection. The part of detection units may refer to a single detection unit or several detection units of the fingerprint detection array 400. It should be understood that in the embodiments of the present disclosure, only a part of detection units of the fingerprint detection array 400 are used for fingerprint pre-detection, rather than all the detection units of the array are used for performing fingerprint pre-detection, which greatly reduces the power consumption of the fingerprint detection apparatus. After performing the fingerprint pre-detection and acquiring data information $Data_1$, the fingerprint detection array 400 sends the data information to the controller 300.

When the data information exceeds a first predetermined threshold, the controller 300 controls the fingerprint detection array 400 to perform fingerprint scanning. To be specific, the fingerprint detection array 400 feeds back the acquired data information $Data_1$ of the fingerprint pre-detection to the controller 300, and the controller 300 performs a next determination. If the controller 300 determines that the data information $Data_1$ is greater than the first predetermined threshold $Data_{TH}$, the controller 300 controls the fingerprint detection array 400 to enter a third operating mode, that is, a fingerprint scanning mode. The first predetermined threshold $Data_{TH}$ may be predefined in the fingerprint detection apparatus.

In other words, if the fingerprint detection array 400 is not touched by a finger, the data information acquired by the fingerprint detection array 400 is $Data_0$; if the fingerprint detection array 400 is touched by a finger, the data information acquired by the fingerprint detection array 400 is $Data_1$. Since if the fingerprint detection array 400 is not touched by a finger, the data information $Data_0$ of the fingerprint pre-detection is almost 0, as long as the data information $Data_1$ is great enough when a finger touches the fingerprint detection array 400, a sufficiently wide range is available for defining the first predetermined threshold $Data_{TH}$, such that whether a finger touches the fingerprint detection apparatus may be further determined.

Upon double confirmation of the capacitance detection mode and the fingerprint pre-detection mode, the fingerprint detection apparatus enters the fingerprint scanning mode to perform fingerprint scanning using all the detection units of the array. As such, both reliability and accuracy of the finger touch detection are improved.

After the fingerprint detection apparatus enters the fingerprint scanning mode, all the detection units of the fingerprint detection array 400 are initiated to perform fingerprint scanning. The fingerprint scanning may be implemented by the fingerprint detection apparatus in a conventional manner, which is not described herein any further.

In another embodiment of the present disclosure, if the detected data information does not exceed the first predetermined threshold $Data_{TH}$, the controller 300 controls the capacitance detection module 100 to return to the capacitance detection mode, that is, the capacitance detection module 100 redetects the capacitance $C_0+C_1$.

In still another embodiment of the present disclosure, the controller 300 determines whether the number of frames acquired in the fingerprint scanning reaches a second predetermined threshold, and if the number of frames reaches the second predetermined threshold, the controller 300 controls the capacitance detection module 100 to return to the capacitance detection mode. In other words, upon completion of acquiring a predetermined number of frames in the fingerprint scanning, the fingerprint detection apparatus returns to the capacitance detection mode.

With the detection apparatus for fingerprint detection in the embodiments of the present disclosure, firstly whether a capacitance on a detection electrode exceeds a predetermined capacitance threshold is determined, and when the capacitance exceeds the predetermined capacitance threshold, a part of detection units of a fingerprint detection array are initiated to perform fingerprint pre-detection and acquire data information; and secondly whether the data information exceeds a first predetermined threshold is determined, and when the data information exceeds a first predetermined threshold, all the detection units of the fingerprint detection array are initiated to perform fingerprint scanning. In this way, the fingerprint detection array is initiated for full-array scanning upon reliable and effective identification that a finger touches a fingerprint detection apparatus, which greatly reduces the power consumption of the fingerprint detection.

It should be understood that each part of the present disclosure may be implemented by using hardware, software, firmware or a combination of them. In the above embodiments, the multiple steps or methods may be implemented by using software or firmware which is stored in a memory and executed by a suitable instruction execution system. For example, if the multiple steps or methods are implemented by using hardware, similar to another embodiment, the steps or methods may be implemented by using any one or a combination of the following technologies that are commonly known in the art: a discrete logic circuit of a logic gate circuit configured to implement logic function to data signals, an application specific integrated circuit having a suitable combinational logic gate, a programmable gate array (PGA), a field-programmable gate array (FPGA), and the like.

In the description of the present specification, reference terms such as "an embodiment", "some embodiments", "examples", "specific examples", "some examples", or the like are intended to refer to that the specific features, structures, materials, or characteristics which are described in combination with the embodiments or examples are included in at least one embodiment or example of the present disclosure. In this to specification, schematic expressions of the above terms do not necessarily indicate the same embodiments or examples. In addition, the described specific features, structures, materials, or characteristics may be combined in any one or multiple embodiments or examples in a suitable way.

Although the embodiments of the present disclosure are described in detail above, persons or ordinary skill in the art may understand that without departing from the principle and intention of the present disclosure, various variations, modifications and replacements may be made to these embodiments, and the scope of the present disclosure is defined by the appended claims and their equivalents.

INDUSTRIAL PRACTICABILITY

With the detection method and apparatus for fingerprint detection in the embodiments of the present disclosure, firstly whether a capacitance on a detection electrode exceeds a predetermined capacitance threshold is determined, and when the capacitance exceeds the predetermined capacitance threshold, a part of detection units of a fingerprint detection array are initiated to perform fingerprint pre-detection and acquire data information; and secondly whether the data information exceeds a first predetermined threshold is determined, and when the data information exceeds a first predetermined threshold, all the detection units of the fingerprint detection array are initiated to perform fingerprint scanning. In this way, the fingerprint detection array is initiated for full-array scanning upon reliable and effective identification that a finger touches a fingerprint detection apparatus, which greatly reduces the power consumption of the fingerprint detection.

What is claimed is:

1. A detection method for fingerprint detection, comprising the following steps:
   S1: detecting a capacitance on a detection electrode of a fingerprint detection apparatus;
   S2: initiating a part of detection units of a fingerprint detection array to perform fingerprint pre-detection, and acquiring data information of the fingerprint pre-detection, when the capacitance exceeds a predetermined capacitance threshold, wherein the fingerprint detection array comprises a plurality of detection units, and the part of detection units is at least one detection unit of the fingerprint detection array; and
   S3: initiating all the detection units of the fingerprint detection array to perform fingerprint scanning, when the data information exceeds a first predetermined threshold;
   wherein the detection electrode is arranged adjacent to the fingerprint detection array;
   a first parasitic capacitance is formed between the detection electrode and a system ground, and the first parasitic capacitance is parallel to a second parasitic capacitance formed between the finger and the system ground;
   wherein the capacitance on the detection electrode is equal to a sum of the first parasitic capacitance and the second parasitic capacitance.

2. The detection method according to claim 1, wherein the method further comprises:
   repeating step S1, when the capacitance does not exceed the predetermined capacitance threshold.

3. The detection method according to claim 1, wherein the method further comprises:
   returning to step S1, when the data information does not exceed the first predetermined threshold.

4. The detection method according to claim 1, wherein upon initiating all the detection units of the fingerprint detection array to perform fingerprint scanning, the method further comprises:
   determining whether the number of frames acquired in the fingerprint scanning reaches a second predetermined threshold, and
   returning to step S1, when number of frames reaches the second predetermined threshold.

5. The detection method according to claim 1, wherein a capacitance between the detection electrode and a system ground is C0; when a finger touches the detection electrode, a capacitance between the finger and the system ground is C1; and the capacitance on the detection electrode is C0+C1.

6. A detection apparatus for fingerprint detection, comprising: a capacitance detection module, a detection electrode, a controller and a fingerprint detection array; wherein the fingerprint detection array comprises a plurality of detection units;
   the detection electrode is arranged adjacent to the fingerprint detection array; a parasitic capacitance is formed between the detection electrode and a system ground, and the parasitic capacitance is parallel to a capacitance formed between the finger and the system ground;
   wherein the capacitance detection module is electrically connected between the detection electrode and the controller, and is configured to detect a capacitance on the detection electrode, and send a detection result to the controller;
   the controller is configured to control the fingerprint detection array to perform fingerprint pre-detection when the capacitance exceeds a predetermined capacitance threshold;
   the fingerprint detection array is electrically connected to the controller, and is configured to, upon receiving a fingerprint pre-detection command from the controller, initiate a part of detection units of the fingerprint detection array to perform the fingerprint pre-detection and acquire data information of the fingerprint pre-detection, and send the data information to the controller;
   the controller is further configured to control the fingerprint detection array to perform fingerprint scanning when the data information exceeds a first predetermined threshold; and
   the fingerprint detection array is further configured to initiate all the detection units to perform the fingerprint scanning upon receiving a fingerprint scanning command from the controller.

7. The detection apparatus according to claim 6, wherein the controller is further configured to control the capacitance detection module to continue detecting the capacitance on the detection electrode, if the capacitance does not exceed the predetermined capacitance threshold.

8. The detection apparatus according to claim 6, wherein the controller is further configured to control the capacitance detection module to redetect the capacitance on the detection electrode, if the data information does not exceed the first predetermined threshold.

9. The detection apparatus according to claim 6, wherein the controller is further configured to determine whether the number of frames acquired in the fingerprint scanning reaches a second predetermined threshold, and control the capacitance detection module to redetect the capacitance on the detection electrode when the number of frames reaches the second predetermined threshold.

10. The detection apparatus according to claim 6, wherein a capacitance between the detection electrode and a system ground is $C_0$; when a finger touches the detection electrode, a capacitance between the finger and the system ground is $C_1$; and the capacitance on the detection electrode is $C_0+C_1$.

11. The detection method according to claim 1, wherein the fingerprint detection apparatus has a capacitance detection mode, a fingerprint pre-detection mode and a fingerprint scanning mode, wherein the fingerprint detection apparatus operates in the capacitance detection mode when step S1 is implemented, operates in the fingerprint pre-detection mode when step S2 is implemented, and operates in the fingerprint scanning mode when step S2 is implemented.

12. The detection method according to claim 11, further comprising:
   maintaining operating in the capacitance detection mode when the capacitance on the detection electrode does not reach the predetermined capacitance threshold, and detecting the sum of the first parasitic capacitance and the second parasitic capacitance repeatedly until the sum of the first parasitic capacitance and the second parasitic capacitance exceeds the predetermined capacitance threshold.

13. The detection method according to claim 12, further comprising:
returning to the capacitance detection mode from the fingerprint pre-detection mode when determining that the data information acquired by the at least one detection unit of the fingerprint detection array in the fingerprint pre-detection mode fails to reach the first predetermined threshold; and
detecting the sum of the first parasitic capacitance and the second parasitic capacitance repeatedly until the sum of the first parasitic capacitance and the second parasitic capacitance exceeds the predetermined capacitance threshold.

14. The detection method according to claim 13, further comprising:
determining whether the number of frames of fingerprint data acquired in the fingerprint scanning mode reaches a second predetermined threshold, and
returning to the capacitance detection mode from the fingerprint scanning mode when the number of frames of fingerprint data reaches the second predetermined threshold.

15. The detection method according to claim 11, wherein when the detection electrode is not touched by a finger, data information acquired by the at least one detection unit of the fingerprint detection array is substantially equal to zero.

16. A detection apparatus for fingerprint detection, comprising:
a fingerprint detection array comprising a plurality of detection units arranged in an array, each of the detection units forms a fingerprint capacitance with a finger;
a detection electrode arranged adjacent to the fingerprint detection array, wherein a first parasitic capacitance is formed between the detection electrode and a system ground, and the first parasitic capacitance is parallel to a second parasitic capacitance formed between the finger and the system ground;
a capacitance detection module electrically connected to the detection electrode, and configured to detect a capacitance on the detection electrode in a capacitance detection mode, wherein the a capacitance on the detection electrode is a sum of the first parasitic capacitance and the second parasitic capacitance; and
a controller electrically connected to the capacitance detection module and the fingerprint detection array;
wherein the controller is configured to control the fingerprint detection array to enter a fingerprint pre-detection mode and initiate only a part of the detection units to perform fingerprint pre-detection for acquiring data information, when the capacitance detection module capacitance detects that the capacitance on the detection electrode exceeds a predetermined capacitance threshold;
wherein the controller is further configured to control the fingerprint detection array to enter a fingerprint scanning mode and initiate all the detection units to perform the fingerprint scanning for acquiring frames of fingerprint data, when the data information acquired by the part of the detection units in the fingerprint pre-detection mode exceeds a first predetermined threshold.

17. The detection apparatus according to claim 16, wherein the capacitance detection module is further configured to maintain operating in the capacitance detection mode and detecting the sum of the first parasitic capacitance and the second parasitic capacitance repeatedly until the predetermined capacitance threshold is reached.

18. The detection apparatus according to claim 17, wherein the controller is further configured to: control the fingerprint detection array to quit from the fingerprint pre-detection mode and control the capacitance detection module to return to the capacitance detection mode for detecting the capacitance on the detection electrode, when the data information acquired by the part of detection unit in the fingerprint pre-detection mode fails to reach the first predetermined threshold.

19. The detection apparatus according to claim 18, wherein the controller is further configured to: control the fingerprint detection array to quit from the fingerprint scanning mode and control the capacitance detection module to return to the capacitance detection mode for detecting the capacitance on the detection electrode, when the number of frames of fingerprint data acquired by all of the detection units in the fingerprint scanning mode reaches a second predetermined threshold.

* * * * *